United States Patent [19]

Tackett, Jr.

[11] Patent Number: 5,069,281
[45] Date of Patent: Dec. 3, 1991

[54] PROCESS FOR ENHANCED DELAYED IN SITU GELATION OF CHROMIUM POLYACRYLAMIDE GELS

[75] Inventor: James E. Tackett, Jr., Littleton, Colo.

[73] Assignee: Marathon Oil Company, Findlay, Ohio

[21] Appl. No.: 609,490

[22] Filed: Nov. 5, 1990

[51] Int. Cl.$^5$ ............................................. E21B 33/138
[52] U.S. Cl. ..................................... 166/295; 166/294; 166/300
[58] Field of Search ................ 166/270, 294, 195, 300; 523/130; 252/8.551

[56] References Cited

U.S. PATENT DOCUMENTS

| | | | |
|---|---|---|---|
| 3,762,476 | 10/1973 | Gall 166 ...................................... | 294/ |
| 3,766,984 | 10/1973 | Nimerick ........................ | 166/295 X |
| 3,978,928 | 9/1976 | Clampitt .............................. | 166/294 |
| 3,981,363 | 9/1976 | Gall ...................................... | 166/270 |
| 4,018,286 | 4/1977 | Gall et al. ............................ | 166/295 |
| 4,039,029 | 8/1977 | Gall ...................................... | 166/294 |
| 4,534,412 | 8/1985 | Dovan et al. .................... | 166/294 X |
| 4,706,754 | 11/1987 | Smith ................................... | 166/295 |
| 4,744,418 | 5/1988 | Sydansk ............................. | 166/270 |
| 4,844,168 | 7/1989 | Sydansk ............................. | 166/270 |
| 4,848,464 | 7/1989 | Jennings, Jr. et al. .......... | 166/295 X |
| 4,917,186 | 4/1990 | Mumallah ........................... | 166/295 |
| 4,959,163 | 9/1990 | Holtmyer et al. ........... | 166/305.1 X |

*Primary Examiner*—George A. Suchfield
*Attorney, Agent, or Firm*—Jack L. Hummel; Jack E. Ebel

[57] ABSTRACT

The present invention is a process for selectively plugging high permeability zones of a subterranean hydrocarbon-bearing formation by enhancing the delay associated with the in situ formation of a polymer gel. The process comprises predetermining a gelation delay time based on a formation's temperature, permeability and porosity, the distance from the well bore a region to be plugged is located, and a volumetric rate of gelation fluid injection. A gelation solution is then prepared comprising polyacrylamide a polyvalent metal carboxylate crosslinking agent, a gelation delaying agent and a buffer with a pKa of about 3.5 to about 6.8. Gelation delays are achieved by selecting the polyacrylamide concentration, delaying agent concentration and type, and buffer concentration and type, for given formation conditions. Delay times can range from several hours to several weeks at formation temperatures near 176° F. (80° C.) and from several hours to about one day at formation temperatures above about 219° F. (104° C.). The prepared solution is then injected into the formation via a well bore and allowed to gel. The gel selectively plugs high permeability zones within a subterranean hydrocarbon-bearing formation, at temperatures and distances from the well formerly unobtainable, resulting in improved vertical or areal conformance of injected fluids and improved oil production.

38 Claims, No Drawings

PROCESS FOR ENHANCED DELAYED IN SITU GELATION OF CHROMIUM POLYACRYLAMIDE GELS

BACKGROUND OF INVENTION

1. Technical Field:

This invention relates to a process for selectively plugging high permeability zones of a subterranean hydrocarbon-bearing formation by enhancing the delay associated with the in situ formation of a polymer gel to improve conformance and flow profiles of fluids injected after gelation.

2. Description of Related Art:

Poor vertical conformance occurs when subterranean formations have vertical juxtapositions of relatively high permeability geologic regions to relatively low permeability geologic regions. Poor areal conformance occurs when subterranean formations contain high permeability streaks and high permeability anomalies within the formation matrix, such as vertical fractures and fracture networks, which have high permeability relative to the formation matrix. Fluids generally exhibit poor flow profiles and sweep efficiencies in subterranean formations having poor vertical or areal conformance. Poor conformance is a problem where structural anomalies such as fracture networks and vertical heterogeneity are in fluid communication with a subterranean well bore across which fluids are injected or produced.

A number of attempts to remedy conformance problems exist. U.S. Pat. Nos. 3,762,476; 3,981,363; 4,018,286; and 4,039,029 to Gall or Gall et al. describe various processes where gel compositions are formed in high permeability regions of subterranean formations to reduce the permeability therein. According to U.S. Pat. No. 3,762,476, a polymer such as polyacrylamide is injected into a formation followed by a crosslinking agent. In practice, treatments such as that disclosed in U.S. Pat. No. 3,762,476 using sequentially injected gel systems have proven unsatisfactory because of the inability to achieve complete mixing of the crosslinking agent with the polymer, which results in incomplete gelation within the formation. Incomplete gelation causes a continuation of poor vertical or areal conformance, poor flow profiles and poor sweep efficiencies within the formation. This problem led to the development of delayed polymer gel techniques.

An attempt to achieve delayed polymer gelation was U.S. Pat. No. 4,706,754 to Smith which describes a process for reducing formation permeability by using polyacrylamide gels in combination with a crosslinking agent and a carboxylic acid delaying agent. The delaying agent allows for the gelation solution to thoroughly mix and be placed in the desired treatment region up to about 24 hours before gelation occurs. However, it is often desirable to delay gelation for longer than 24 hours to enable a gel to be placed at distances from the injection well that takes longer than 24 hours to achieve.

U.S. Pat. No. 4,744,418 to Sydansk discloses that at temperatures below 140° F. (60° C.), gelation can be delayed by decreasing the amount of polymer hydrolysis. U.S. Pat. No. 4,844,168 also to Sydansk discloses that above temperatures of about 140° F. (60° C.) polyacrylamide autohydrolysis increases at a rate that is proportional to the increase in temperatures. Sydansk also discloses that delayed gelation can be achieved at temperatures above about 140° F. (60° C.) by utilizing polyacrylamide having less than 0.1% hydrolysis. Sydansk is able to achieve delays in gelation of up to about 168 hours at about 165° F. (74° C.) and up to about 20 hours at temperatures of about 219° F. (104° C.). However it is often desirable to delay gelation for longer than 168 hours at temperatures of about 165° F. (74° C.) and longer than 20 hours at temperatures of about 219° F. (104° C.). Therefore a need exists for a gelation process wherein gelation delays can be enhanced when reservoir temperatures exceed 165° F. (74° C.) and exceed 219° F. (104° C.).

It is therefore an object of this invention to provide a process for selectively plugging high permeability zones of a subterranean hydrocarbon-bearing formation by use of an aqueous polymer gelation solution in which gelation is delayed for several hours to several weeks when formation temperatures are near 176° F. (80° C.). It is a further object of this invention to provide a delayed gelation solution which can be used at temperatures above about 219° F. (104° C.) where gelation can be delayed for several hours to about one day.

SUMMARY OF INVENTION

The present invention is a process for selectively plugging high permeability zones of a subterranean hydrocarbon-bearing formation penetrated by a well bore. The process improves matrix conformance in the formation and correspondingly improves flow profiles and sweep efficiencies of injected and/or produced fluids in the formation. These objectives and others are achieved by an in situ polymer gelation process employing a gelation solution comprising a crosslinkable polymer, a crosslinking agent, a gelation delaying agent and a buffer to control pH. In the most favorable application of this invention, the gelation delaying agent also serves as a buffer to control pH.

According to the present invention, a gelation delay is predetermined based on the formation temperature, permeability and porosity, the distance of the region to be plugged from the well bore and the volumetric rate at which gelation fluid is to be injected. An aqueous gelation fluid is then prepared containing a polyacrylamide, a polyvalent metal carboxylate crosslinking agent, a gelation delaying agent and a buffer with a pKa of about 3.5 to about 6.8. The solution is injected into the formation via a well bore in fluid communication therewith and displaced into the desired treatment region by subsequently injected displacement fluid, if needed. The gelation delaying agent (having about a 3.5 to about 6.8 pKa) and buffer's function is to 1) buffer the pH of the gelation solution so that ammonia generated by the initial hydrolysis reaction does not increase the solution pH, and 2) to compete with the polymer carboxylate groups for sites on the chromium crosslinking agent so that the small amount of hydrolysis that will occur before the buffer capacity is exceeded (e.g. due to formation temperatures) is not sufficient to cause gelation. These two functions inhibit gelation until the solution has propagated into the matrix. Gelation time delays are dependent on the molecular weight and concentration of polymer in solution, on the buffer type and concentration, and on the temperature of the subterranean formation that is to be treated. The distance from the well bore that can be achieved within the gelation time depends on the permeability and porosity of the formation and the volumetric rate of gelation fluid injection into the formation. Once in the matrix to be treated, the gelation solution gels setting up as a continuous single-phase gel composition comprised of the polymer and crosslinking agent, resulting in a substantial reduction of permeability within the matrix.

After the gelation treatment, fluids may be injected into and/or produced from the hydrocarbon-bearing regions of the formation in fluid communication with the well bore resulting in improved vertical or areal conformance and improved oil production. The gel is substantially incapable of flowing from the treated matrix and is resistant to in situ degradation, making it substantially permanent.

The process provides distinct advantages over gelation processes known in the art. The gelation solution can be prepared at the surface under controlled conditions and gelation can be delayed at temperatures in excess of 176° F. (80° C.) until the solution is placed in the desired matrix. The resulting gel has both the strength and stability to meet the demands of the treated matrix.

DESCRIPTION OF THE PREFERRED EMBODIMENTS

According to the present invention, a gelation delay time is predetermined based on the temperature of the formation, the distance the region to be treated is from the well bore, the permeability and porosity of the formation, and the volumetric rate at which gelation fluid is to be injected. The gelation delay time is that amount of time from the mixing of aqueous gelation solution components to solution gelation. Ideally, this time is approximately the same amount of time that is required to place an aqueous gelation solution into the region to be plugged. The aqueous gelation solution is prepared by admixing a polyacrylamide polymer, a polyvalent metal carboxylate crosslinking agent, a gelation delaying agent, and a buffer in an aqueous solvent at the surface.

The polyacrylamide polymer has an average molecular weight of about 100,000 to about 11,000,000, and preferably about 200,000 to 1,000,000 and most preferably about 250,000 to about 300,000. The polyacrylamide has most preferably less than about 0.1 mole % polymer carboxylate groups. The low hydrolysis polymer can be made via a free radical polymerization at temperatures of about 72° F. (22° C.) and at prepolymerization pH's of about 4.5. After manufacture the low hydrolysis level is maintained by adjusting the polymer solution pH to about 3.5 to about 6.8 as disclosed in commonly assigned copending U.S. patent application, Ser. No. 609,492 in the name of James E. Tackett et al. and entitled "A Method for Inhibiting Hydrolysis of Polyacrylamide", which is being filed concurrently herewith. The polymer concentration in the gelation solution is about 0.05% to 10% by weight, preferably 1% to 8% by weight and most preferably about 2% to about 5% by weight of polymer in water.

The crosslinking agent is a polyvalent metal carboxylate complex crosslinking agent derived from a carboxylate compound or mixture thereof. In solution, the crosslinking agent comprises an electronegative carboxylate species which may include one or more of the following water soluble species: formate, acetate, proprionate, lactate, substituted derivatives thereof, and mixtures thereof. In addition to electronegative carboxylate species, the solution comprises electropositive metallic species such as $Al^{3+}$, $Fe^{3+}$, $Ti^{4+}$, $Zn^{2+}$, $Sn^{4+}$, $Cr^{3+}$, etc. The preferred crosslinking agents are chromium (III) acetate complexes. The weight ratio of polymer to crosslinking agent is advantageously about 5:1 to about 50:1 and preferably about 6:1 to about 20:1 and more preferably about 7:1 to about 10:1.

The gelation delaying agent is a monocarboxylic acid or a monocarboxylic acid salt or mixtures thereof in sufficient concentration to raise or lower the pH of the aqueous gelation solution to about 3.5 to about 6.8, preferably about 3.5 to about 6 and most preferably about 3.5 to about 5. Exemplary acids include formic, acetic, propionic, lactic, etc. Exemplary acid salts include salts of formate, acetate, propionate, lactate, etc.

In addition to the delaying agent, the buffer is any water soluble buffer having a pKa value of about 3.5 to about 6.8, preferably of about 3.5 to about 6 and most preferably about 3.5 to about 5. Exemplary buffers include monocarboxylates such as formate, acetate, propionate and lactate salts, hydrogen phosphates and polyamines such as triethylene tetraamine, tetraethylene pentamine and hexamethylene tetraamine or mixtures thereof. Dicarboxylate and tricarboxylate buffers such as those based on the use of malonic, oxalic and citric acids should be avoided because the closely spaced dicarboxylates and tricarboxylates strongly chelate the chromium (III) gelation agent thereby preventing gelation.

The molar ratio of delaying agent/buffer to polyacrylamide is in the range of about 0.1:1 to about 3.0:1, preferably about 0.5:1 to about 2.5:1 and most preferably about 0.75 to 1 to about 2.0:1.

The polymer, crosslinking agent, delaying agent and the buffer can be mixed at or near the wellhead by in-line mixing means before or during injection. Or, the delaying agent, polymer and buffer can be admixed then the crosslinking agent can be added to form a bulk gelation solution suitable for injection. Sequential injection should not be used because it results in inadequate mixing and subsequent incomplete gelation.

The aqueous solvent of the gelation solution can be fresh water or brine containing a total dissolved solids concentration up to the solubility limit of the solids in water.

The gelation solution is injected into a subterranean formation via an injection well and may be displaced into the region to be treated by a subsequently injected displacement fluid such as fresh water or brine, if necessary. The total dissolved solids content in the fresh water or brine is equal to or less than the solubility limit of the dissolved solids in water. After the gelation delay time, the gel forms. The gel selectively plugs the high permeability zones within the subterranean formation resulting in improved vertical or areal conformance and improved production.

The present process enables the practitioner to control gelation rate. Gelation rate is defined as the degree of gel formation as a function of time or, synonymously, the rate of crosslinking of the polyacrylamide in the gelation solution. The degree of crosslinking may be quantified in terms of gel fluidity and/or rigidity. Generally, gel fluidity decreases and gel rigidity increases as the number of crosslinks within a gel increases. The gelation delaying agent and buffer inhibit hydrolysis of the polyacrylamide and increase the time until significant gelation occurs. Gelation is delayed by three effects. First, very low hydrolysis polyacrylamide (less than about 0.1 mole %) is used which slows the rate of gelation by providing fewer sites on the polymer chain for the crosslinking agent to crosslink with. Second, by using excess buffers with pKa's of about 3.5 to about 6.8 that contain carboxylate groups, the buffers compete with the polymer carboxylate for sites on the crosslinking agent and thereby slow the crosslinking reaction. And, third, hydrolysis of polyacrylamide is severely retarded in the pH range of about 3.5 to about 6.8. After the gelation solution has been placed within the area to be treated, the low hydrolysis polyacrylamide, delaying agent and the buffer, which functions in about the pH 3.5 to about the pH 6.8 range, delay the hydrolysis of the polyacrylamide which in turn delays gelation. Gradually, some hydrolysis will occur and as the release of ammonia (from hydrolysis of the amide group on the polyacrylamide to a carboxylate group) exceeds the buffer capacity, the pH of the solution will increase in situ, the newly formed polymer carboxylate groups will successfully compete with the other carboxylate groups and gelation will begin.

The following example demonstrates the practice and utility of the present invention but is not to be construed as limiting the scope thereof.

EXAMPLE

An acetate stock solution is prepared by mixing 76.7 grams of anhydrous sodium acetate with 500 ml of distilled water and then adding sufficient hydrochloric acid to adjust the pH to 4.5.

A polyacrylamide solution is prepared by diluting a 20% by weight solution of 280,000 average mw polyacrylamide (which has less than about 0.1 mole % polymer carboxylate groups) to 5% by weight using either distilled water or combinations of distilled water and acetate stock solution to produce solutions containing 0, 0.5, 1, and 2 moles of acetate per mole of polyacrylamide (based on the corresponding monomer molecular weight).

Pregel solutions are prepared by adding 0.616 ml of 50% chromium acetate complex solution to 60 ml of polyacrylamide solution.

25 ml of the pregel solutions are then placed in 75 ml ampules. The ampules are evacuated, sealed and placed in ovens at 176° F. (80° C.), 219° F. (104° C.) and 255° F. (124° C.).

The following gelation results were obtained:

| Temperature 176° F. (80° C.) Mole Ratio of Acetate to Polyacrylamide | | | | |
|---|---|---|---|---|
| Time, Days | 0 | 0.5 | 1.0 | 2.0 |
| 1 | A | A | A | A |
| 2 | A | A | A | A |
| 3 | A | A | A | A |
| 4 | A | A | A | A |
| 5 | C | A | A | A |
| 6 | H | A | A | A |
| 7 | I | A | A | A |
| 8 | I | A | A | A |
| 9 | I | D | C | A |
| 10 | I | H | H | C |
| 11 | I | H | H | H |
| 12 | I | H+ | H+ | H+ |
| 13 | I | H+ | I | I |

| Temperature 219° F. (104° C.) Mole Ratio of Acetate to Polyacrylamide | | | | |
|---|---|---|---|---|
| Time, hours | 0 | 0.5 | 1.0 | 2.0 |
| 1 | A | A | A | A |

| -continued Temperature 219° F. (104° C.) Mole Ratio of Acetate to Polyacrylamide | | | | |
|---|---|---|---|---|
| Time, hours | 0 | 0.5 | 1.0 | 2.0 |
| 2 | A | A | A | A |
| 4 | A | A | A | A |
| 6 | A | A | A | A |
| 8 | A | A | A | A |
| 12 | I | A | A | A |
| 20 | I | A | A | A |
| 27 | I | C | A | A |
| 28 | I | C | A | A |
| 30 | I | E | C | B |
| 32 | I | F | D | C |
| 34 | I | H | G | G |
| 36 | I | I | H | I |
| 38 | I | I | I | I |

| Temperature 255° F. (124° C.) Mole Ratio of Acetate to Polyacrylamide | | | | |
|---|---|---|---|---|
| Time, hours | 0 | 0.5 | 1.0 | 2.0 |
| 1 | A | A | A | A |
| 2 | A | A | A | A |
| 4 | I | A | A | A |
| 6 | I | A | A | A |
| 8 | I | A | A | A |
| 12 | I | I | G | I |
| 20 | I | I | I | I | where:

Code

A = No detectable gel formed: The gel appears to have the same viscosity as the original polymer solution and no gel is visually detectable.
B = Highly flowing gel: The gel appears to be only slightly more viscous than the initial polymer solution.
C = Flowing gel: Most of the obviously detectable gel flows to the ampule top upon inversion.
D = Moderately flowing gel: A small portion (about 5 to 15%) of the gel does not readily flow to the ampule top upon inversion.
E = Barely flowing gel: The gel can barely flow to the ampule top and/or a significant portion (>15%) of the gel does not flow upon inversion.
F = Highly deformable non-flowing gel: The gel does not flow to the ampule top upon inversion.
G = Moderately deformable non-flowing gel: The gel flows about half way down the ampule upon inversion.
H = Slightly deformable non-flowing gel: Only the gel surface slightly deforms upon inversion.
I = Rigid gel: There is no gel-surface deformation upon inversion; and the gel is stable and clear.

These data show that the acetate buffer delays gelation at a rate that depends on temperature and concentration of buffer. Gels of type C or stronger are needed to improve conformance within a hydrocarbon-bearing subterranean formation. As can be seen from the results, at a 2:1 acetate to polyacrylamide mole ratio at 255° F. (124° C.), gelation can be effectively delayed for more than 8 hours. As temperature decreases to 219° F. (104° C.), gelation can be delayed for more than 30 hours and at 176° F. (80° C.) gelation can be delayed for more than 9 days. This means that the lower the formation temperature the greater the gelation delay that can be achieved. The results also show that generally as the mole ratio of acetate to polyacrylamide increases the gelation delay increases. Although not shown in these results, the molecular weight and concentration of polymer in solution is important to the rate of gelation. Generally, the greater the molecular weight and concentration of polymer, the faster the gelation and the more rigid the gel. The effective range of polymer concentration in aqueous solution depends on polymer molecular weight and is about 0.05% to about 10%, preferably about 1% to about 8% and most preferably about 2% to about 5%. Additionally, changing the buffer type and concentration will cause the pH and buffer capacity of the solution to change which will in turn effect the gelation delay that is achieved.

The use of this invention, therefore, allows the skilled practitioner to achieve variable gelation delay times by selection of polymer molecular weight, concentration, buffer concentration and buffer type and delaying agent concentration and type. These variable gelation delays can then be tailored to the temperature, permeability and porosity of the formation to be treated, thereby allowing the skilled practitioner to selectively plug high permeability zones within a formation by delaying gelations from several hours to several weeks.

The process is applicable to conformance treatment of formations under most conditions and is specific to treating regions within the formation which are in fluid communication with an injection or production well. The process is applicable to the treatment of anomalies such as streaks of high permeability, and fracture networks that require several days to several weeks to reach by injection methods. Selectively plugging these high permeability zones results in improved conformance and flow profiles of fluids injected after gelation.

The process is particularly applicable to conformance treatment of formations having temperatures of near 176° F. (80° C.) in which gelation delays of several hours to several weeks are required and at temperatures above about 219° F. (104° C.) in which gelation delays of several hours to about one day are required.

While preferred embodiments of the invention have been described and shown, it is understood that all alternatives and modifications such as those suggested and others, may be made thereto and follow in the scope of the invention.

I claim:

1. A process for selectively plugging high permeability regions in a subterranean hydrocarbon-bearing formation penetrated by a well bore in fluid communication with said high permeability regions, the process comprising:
   predetermining a gelation delay time required to place an aqueous gelation solution into said high permeability regions;
   preparing at the surface said aqueous gelation solution comprised of a polyacrylamide polymer containing less than about 0.1 mole % polymer carboxylate groups, a delaying agent, an aqueous solvent, a buffer, and a polyvalent metal carboxylate crosslinking agent capable of crosslinking polyacrylamide;
   injecting said aqueous gelation solution into said high permeability regions via said well bore;
   gelling said aqueous gelation solution in said high permeability region after said gelation delay time to reduce the permeability of said region.

2. The process of claim 1 wherein said gelation solution is prepared by in-line mixing of said polyacrylamide, crosslinking agent, delaying agent. and buffer during simultaneous injection of said polyacrylamide, crosslinking agent, delaying agent and buffer in said well bore.

3. The process of claim 1 wherein said gelation solution is prepared by mixing said polyacrylamide, delaying agent, buffer, and crosslinking agent in solution and injecting the mixture into the well bore.

4. The process of claim 1 wherein the molar ratio of delaying agent to polyacrylamide is in the range of about 0.1:1 to about 3.0:1.

5. The process of claim 4 wherein the molar ratio of delaying agent to polyacrylamide is in the range of about 0.5:1 to about 2.5:1.

6. The process of claim 5 wherein the molar ratio of delaying agent to polyacrylamide is in the range of about 0.75 to 1 to about 2.0:1.

7. The process of claim 1 wherein said high permeability regions are fractures in said formation.

8. The process of claim 1 wherein said high permeability regions are anomalies in said formation.

9. The process of claim 1 wherein said delaying agent is a monocarboxylic acid, a monocarboxylic acid salt or a mixture thereof.

10. The process of claim 9 wherein said monobasic carboxylic acid is formic, acetic, propionic or lactic acids.

11. The process of claim 9 wherein said monocarboxylic acid salt is formate, acetate, propionate or lactate.

12. The process of claim 9 wherein said solution has a pH of from about 3.5 to about 6.8.

13. The process of claim 9 wherein said solution has a pH of from about 3.5 to about 6.

14. The process of claim 9 wherein said delaying agent is added to said solution until said solution reaches a pH of about 3.5 to 5.

15. The process of claim 1 wherein said buffer has a pKa of about 3.5 to about 6.8.

16. The process of claim 15 wherein said buffer has a pKa of about 3.5 to about 6.

17. The process of claim 16 wherein said buffer has a pKa of about 3.5 to about 5.

18. The process of claim 15 wherein said buffer is selected from the group comprising a monocarboxylate, a hydrogen phosphate, a polyamine or mixtures thereof.

19. The process of claim 18 wherein said monocarboxylate is formate, acetate, propionate, or lactate salts or mixtures thereof.

20. The process of claim 18 wherein said polyamine is triethylene tetraamine, tetraethylene pentamine, hexamethylene tetraamine or mixtures thereof.

21. The process of claim 1 wherein said polyacrylamide has an average molecular weight of about 100,000 to about 11,000,000.

22. The process of claim 21 wherein said polyacrylamide has an average molecular weight of about 200,000 to about 1,000,000.

23. The process of claim 22 wherein said polyacrylamide has an average molecular weight of about 250,000 to about 300,000.

24. The process of claim 1 wherein the weight ratio of said polyacrylamide to said crosslinking agent is about 5:1 to 50:1.

25. The process of claim 24 wherein the weight ratio of said polyacrylamide to said crosslinking agent is preferably about 6:1 to about 20:1.

26. The process of claim 25 wherein the weight ratio of said polyacrylamide to said crosslinking agent is about 7:1 to about 10:1.

27. The process of claim 1 wherein the concentration of said polyacrylamide in said aqueous solution is in the range of about 0.05% to about 10% by weight.

28. The process of claim 27 wherein the concentration of said polyacrylamide in said aqueous solution is in the range of about 1% to about 8% by weight.

29. The process of claim 28 wherein the concentration of said polyacrylamide in said aqueous solution is in the range of about 2% to about 5% by weight.

30. The process of claim 1 wherein a displacement fluid is injected into said formation via said well bore following the injection of said gelation solution.

31. The process of claim 30 wherein said gelation solution is displaced into said high permeability region by said displacement fluid.

32. The process of claim 30 wherein said displacement fluid is fresh water or brine.

33. The process of claim 32 wherein said fresh water or brine has a total dissolved solids content equal to or less than the solubility limit of the solids in water.

34. The process of claim 1 wherein said polyvalent metal carboxylate crosslinking agent is formed of at least one electropositive chromium (III) species and at least one electronegative carboxylate species.

35. The process of claim 1 wherein said formation has a temperature near 176° F. (80° C.).

36. The process of claim 35 wherein said gelation delay time is several hours to several weeks.

37. The process of claim 1 wherein said formation has a temperature exceeding 219° F. (104° C.).

38. The process of claim 37 wherein said gelation delay time is several hours to about one day.

* * * * *